US008657586B2

(12) United States Patent
Achor

(10) Patent No.: US 8,657,586 B2
(45) Date of Patent: Feb. 25, 2014

(54) VOLTAGE COMPENSATING PISTON FUEL PUMP AND FUEL DELIVERY SYSTEM THEREWITH

(75) Inventor: Kyle Achor, Monticello, IN (US)

(73) Assignee: Carter Fuel Systems, LLC, Cleveland, OH (US)

( * ) Notice: Subject to any disclaimer, the term of this patent is extended or adjusted under 35 U.S.C. 154(b) by 380 days.

(21) Appl. No.: 12/974,218

(22) Filed: Dec. 21, 2010

(65) Prior Publication Data

US 2012/0156058 A1 Jun. 21, 2012

(51) Int. Cl.
*G05B 5/01* (2006.01)
*F04B 49/06* (2006.01)
*F04B 17/03* (2006.01)

(52) U.S. Cl.
USPC ......... 417/44.11; 417/411; 318/442; 318/479

(58) Field of Classification Search
USPC ........ 417/44.11, 411; 318/442, 459, 479, 504
See application file for complete search history.

(56) References Cited

U.S. PATENT DOCUMENTS

| | | | | |
|---|---|---|---|---|
| 3,381,616 | A | 5/1968 | Wertheimer | |
| 4,101,950 | A | 7/1978 | Hager et al. | |
| 4,260,333 | A | 4/1981 | Schillinger | |
| 4,330,238 | A | 5/1982 | Hoffman | |
| 4,508,077 | A | 4/1985 | Shimbara | |
| 4,661,048 | A | 4/1987 | Masaka | |
| 4,756,291 | A | 7/1988 | Cummins et al. | |
| 4,800,859 | A | 1/1989 | Sagisaka et al. | |
| 5,092,302 | A * | 3/1992 | Mohan | 123/497 |
| 5,291,578 | A | 3/1994 | Kalami | |
| 5,379,741 | A | 1/1995 | Matysiewicz et al. | |
| 5,505,180 | A | 4/1996 | Otterman et al. | |
| 5,908,286 | A | 6/1999 | Clemmons | |
| 6,279,544 | B2 | 8/2001 | Rumpf | |
| 7,448,363 | B1 | 11/2008 | Rasmussen et al. | |
| 7,481,202 | B2 * | 1/2009 | Posselt et al. | 123/497 |
| 2005/0126539 | A1 * | 6/2005 | Okamoto | 123/446 |

FOREIGN PATENT DOCUMENTS

| | | | |
|---|---|---|---|
| DE | 3025283 | A1 | 2/1982 |
| DE | 19950232 | A1 | 4/2001 |
| DE | 102004002105 | B3 | 6/2005 |
| DE | 102009002737 | A1 | 11/2009 |
| EP | 1195514 | A2 | 4/2002 |
| JP | 59039960 | A | 3/1984 |

OTHER PUBLICATIONS

International Search Report PCT/US2011/064767 mailed on Apr. 10, 2012.
International Search Report PCT/US2011/064767 mailed on Sep. 10, 2012.

* cited by examiner

*Primary Examiner* — Charles Freay
(74) *Attorney, Agent, or Firm* — Benesch, Friedlander, Coplan & Aronoff, LLP

(57) ABSTRACT

A piston-type fuel pump is provided. The fuel pump includes a housing bounding an internal cavity with a cylindrical tube disposed in the internal cavity. The cylindrical tube provides a bore extending along an axis and a piston is disposed in the bore. A spring is configured to bias the piston in a first direction along the axis. A coil is disposed about the cylindrical tube and a control circuit is disposed in the internal cavity. The control circuit is configured in electrical communication with the coil. The voltage supplied to the control circuit can be varied, with the control circuit compensating for the variable supply voltage to regulate the actuation of the coil from a de-energized state to an energized state. The piston is biased in a second direction opposite the first direction in response to the coil being actuated.

13 Claims, 3 Drawing Sheets

VOLTAGE COMPENSATING PISTON FUEL PUMP AND FUEL DELIVERY SYSTEM THEREWITH

BACKGROUND OF THE INVENTION

1. Technical Field

This invention relates generally to electronic fuel pumps, and more particularly to electric piston-type fuel pumps.

2. Related Art

Piston type fuel pumps are commonly employed as diesel priming pumps, diesel lift pumps and marine lift pumps. Piston type pumps are typically actuated by an annular coil that is repeatedly energized and de-energized, thereby causing a piston within the pump to reciprocate axially in a pumping motion. Accordingly, when a predetermined voltage is supplied to the coil, the coil is energized, and the piston is caused to move in one direction, while the piston moves in an opposite direction under the bias of a spring upon de-energizing the coil. The voltage supplied to the coil is typically supplied having a single predetermined voltage value, e.g. 12V, wherein the voltage must be within a predetermined tolerance range in order to energize the coil.

SUMMARY OF THE INVENTION

In accordance with one aspect of the invention, a piston-type fuel pump is provided. The fuel pump includes a housing bounding an internal cavity with a cylindrical tube disposed in the internal cavity. The cylindrical tube provides a bore extending along an axis and a piston is disposed in the bore. A spring is configured to bias the piston in a first direction along the axis and a coil is disposed about the cylindrical tube. A control circuit is disposed in the internal cavity. The control circuit is configured in electrical communication with the coil to regulate the actuation of the coil from a de-energized state to an energized state in response to a voltage supplied to the control circuit. The piston is biased in a second direction opposite the first direction when the coil is in the energized state.

In accordance with another aspect of the invention, the control circuit is configured to receive a supply voltage ranging between 12V and 24V and to maintain a constant volume of fuel output from the fuel pump independent of the supply voltage.

According to another aspect of the invention, a method of a fuel delivery system is provided. The system includes a fuel tank and a high pressure fuel pump upstream of the fuel tank, wherein the high pressure fuel pump is configured in fluid communication with the fuel tank. The system further includes a low pressure fuel pump upstream of the fuel tank and downstream of the high pressure fuel pump. The low pressure fuel pump has an inlet configured in fluid communication with the fuel tank and an outlet configured in fluid communication with the high pressure fuel pump. The low pressure fuel pump has a control circuit configured to maintain a constant flow of fuel from the outlet in response to receiving a variable voltage signal.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
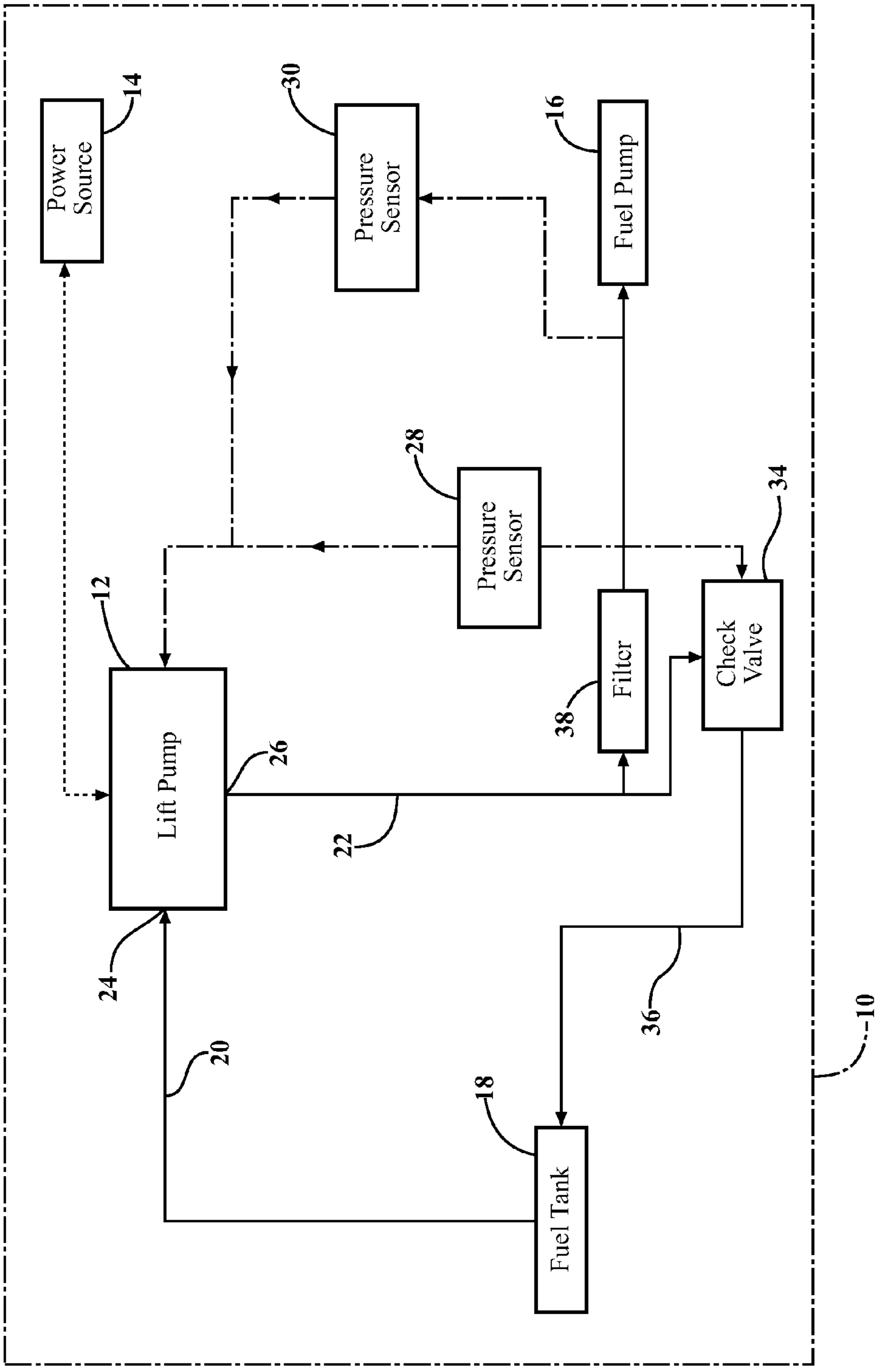
FIG. 1 is a flow diagram illustrating a fuel flow circuit incorporating a lift pump constructed in accordance with one presently preferred aspect of the invention.

Referring in more detail to the drawings, FIG. 1 illustrates fuel delivery system 10 having a low pressure fuel pump, also referred to as lift pump 12, constructed in accordance with one aspect of the invention. The lift pump 12 is configured for actuation via a power source 14, wherein the power source 14 can be provided having a range of voltages, such as between about 12V to 24V. Regardless of the voltage supplied to the lift pump 12, the lift pump 12 supplies fuel at a predetermined constant flow rate to a downstream high pressure fuel pump 16. Accordingly, regardless of the voltage of the power source, e.g. 12V or 24V, the flow rate of fuel from the lift pump 12 is provided at a predetermined constant rate. Thus, the lift pump 12 is suitable for use with a variety of power sources 14 regardless of their voltage.

The system 10 includes a fuel tank 18 upstream of the lift pump 12. The lift pump 12 has an inlet 24 configured in fluid communication with the upstream fuel tank 18 via a first fuel line 20 and an outlet 26 configured in fluid communication with the downstream high pressure fuel pump 16 via a second fuel line 22. Accordingly, the lift pump 12 is positioned between the fuel tank 18 and the high pressure fuel pump 16.

In addition, the system 10 illustrated has a first pressure sensor 28 and a second pressure sensor 30. The first pressure sensor 28 is configured in fluid communication with the second fuel line 22 to detect the pressure of the fuel flowing between the lift pump 12 and the high pressure fuel pump 16. The first pressure sensor 28 is further configured in communication with the lift pump 12, and in particular, with a control circuit 32 disposed within the lift pump 12, also referred to as printed circuit board (PCB), as well as a check valve 34 configured in fluid communication with the fuel tank 18 via a return fuel line 36. As such, if the pressure of the liquid fuel within the second fuel line 22 is detected by the first pressure sensor 28 as being below a predetermined limit, the signal sent from the first pressure sensor 28 to the control circuit 32 causes the control circuit 32 to increase the fuel flow from the lift pump 12 until the detected pressure in the second fuel line 22 reaches the predetermined limit. In contrast, if the detected pressure is above the predetermined limit, then the check valve 34 is automatically actuated to move from a closed position to an open position to allow a temporary flow of fuel from the second fuel line 22 back to the fuel tank 18 until the detected pressure in the second fuel line 22 reaches the predetermined limit.

The second pressure sensor 30 is located downstream of the first pressure sensor and upstream of the high pressure fuel pump 16. As with the first pressure sensor 28, the second pressure sensor 30 is configured in fluid communication with the second fuel line 22 to detect the pressure of the fuel flowing between the lift pump 12 and the high pressure fuel pump 16. As with the first pressure sensor 28, the second pressure sensor 30 is configured in communication with the control circuit 32. Thus, if the pressure of fuel within the second fuel line 22 is detected by the second pressure sensor 30 as being below a predetermined limit, the signal sent from the second pressure sensor 30 to the control circuit 32 causes the control circuit 32 to increase the fuel flow rate from the lift pump 12 until the detected pressure in the second fuel line 22 reaches the predetermined limit. However, if the pressure of fuel within the second fuel line 22 is detected by the second pressure sensor 30 as being above a predetermined limit, the signal sent from the second pressure sensor 30 to the control circuit 32 causes the control circuit 32 to decrease the fuel flow rate from the lift pump 12 until the detected pressure in the second fuel line 22 reaches the predetermined limit.

In addition, the system 10 is also illustrated having a filter 38. The filter 38 is depicted as being in the second fuel line 22 between the lift pump 12 and the high pressure pump 16. It should be recognized that additional filters could be employed in other areas of the system 10, including in the first fuel line 20, by way of example and without limitation.

Figure 2:
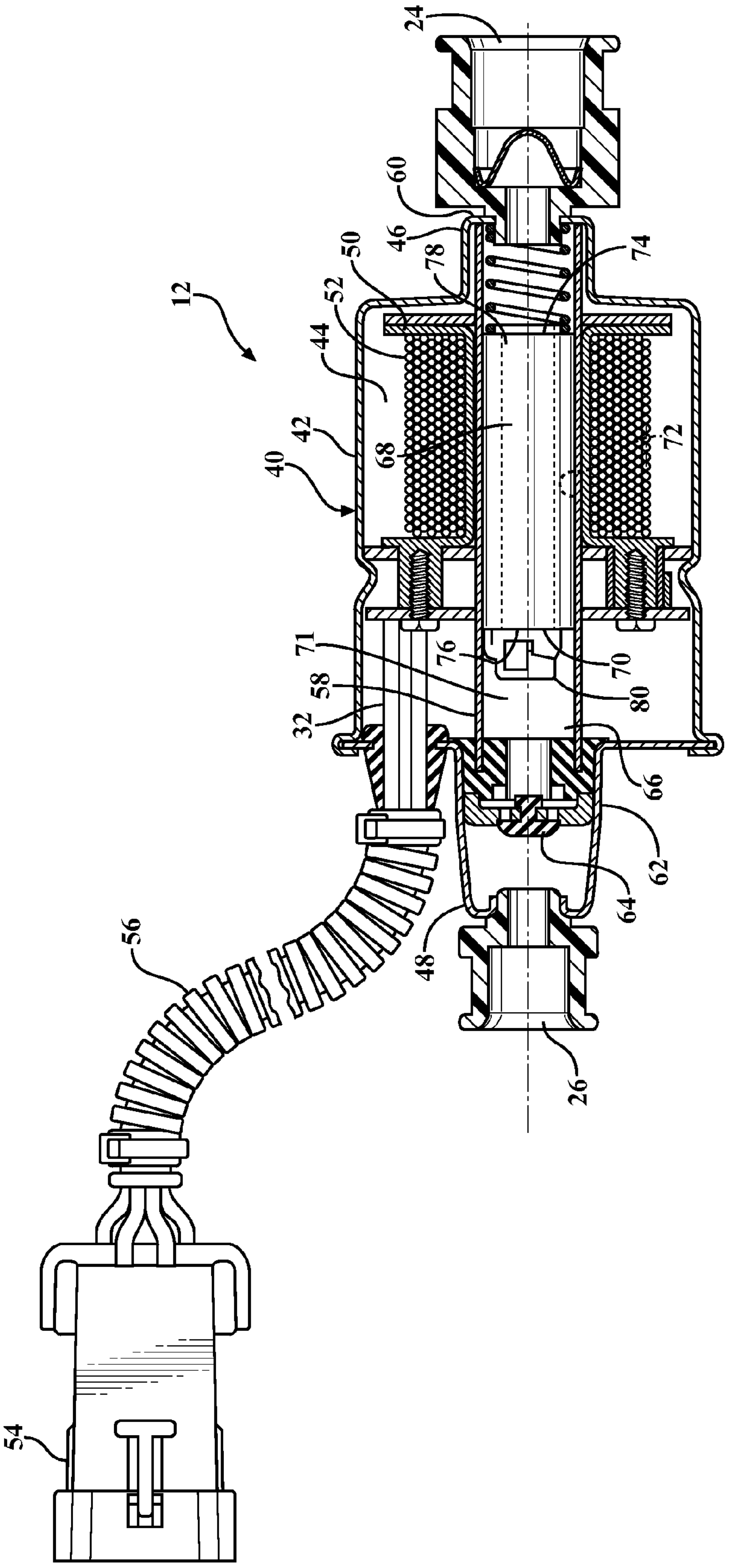
FIG. 2 is a partial cross-sectional view of the schematically illustrated lift pump of FIG. 1 with a piston of the lift pump shown in a retracted position.

As noted above, the lift pump 12 is configured, via the integral control circuit 32, to automatically compensate for a variable input voltage from the power source 14 to supply a constant or substantially constant predetermined flow rate of fuel from the lift pump outlet 26. The control circuit 32, as best shown in FIG. 2, is disposed within a housing 40 of the lift pump 12. The housing 40 is shown, for example, as having a generally cylindrical wall 42 bounding an internal cavity, also referred to as inner chamber 44, wherein the wall 42 extends axially to opposite necked-down (reduced diameter) inlet and outlet ends 46, 48, respectively. The inner chamber 44 is sized for receipt of a coil spool 50, shown as being generally bobbin shaped. The coil spool 50 is configured for receipt of an annular wire coil 52 about its outer surface. The wire coil 52 is in electrical communication with an electrical connector 54 via a wire harness 56. The electrical connector 54 is configured for attachment in electrical communication with the power source 14.

The lift pump 12 includes a tubular member, such as a cylindrical tube 58, extending through the coil spool 50 between the opposite ends 46, 48 of the outer wall 42. Accordingly, the coil 52 is disposed about an outer surface of the tubular member 58. The cylindrical tube 58 extends between opposite ends 60, 62. One end 60 of the tube is shown as being received and fixed in the necked-down inlet end 46 of the outer wall 42 and the opposite end 62 is shown as being fixed to a valve member 64 within the outlet end 48 of the outer wall 42. The valve member 64 is provided as a one-way, unidirectional valve allowing fuel to flow from the inlet end 46 though the outlet end 48, but not in reverse flow. It should be recognized that any known one-way valve mechanism can be used, such as an elastomer umbrella style valve or otherwise, as are known the art of fuel pumps.

The cylindrical tube 58 provides a bore 66 sized for reciprocating receipt of a piston 68 along an axis of the bore 66. The piston 68 is formed from a tubular member having a hollow wall 71 providing a through passage 72 that extends along the entire length of the piston 68 between opposite ends 74, 76 of the piston 68. One of the ends 74 of the piston 68 is configured for abutment with a spring, also referred to as spring member 78, shown as a coil spring, for example, and the other end 76 is configured for attachment to a one-way, unidirectional flow valve member, referred to hereafter as piston valve 80. The piston valve 80 allows fuel to flow freely from the inlet 34 end of the lift pump 12 through the piston bore 66 and out the outlet 26 end of the lift pump 12, however, the piston valve 80 prevents the return flow of the fuel through the piston bore 66 once it has passed thereby. The piston valve 80, being fixedly attached to the end 76 of the piston 68, moves conjointly with the piston 68 as it reciprocates in the bore 66 of the tube 58.

Figure 3:
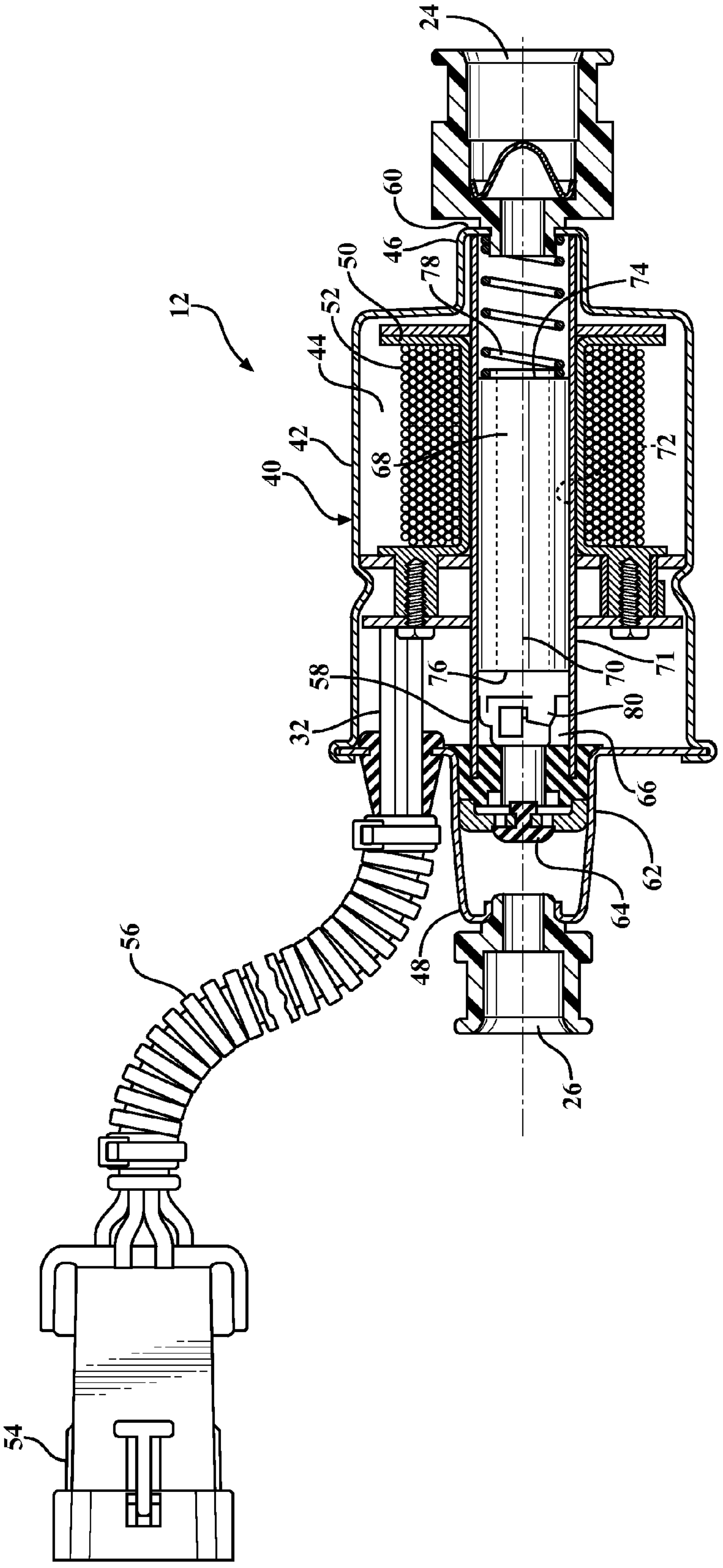
FIG. 3 is a view similar to FIG. 2 with the piston shown in an extended position.

In use, the piston 68 reciprocates in response to the coil 52 being energized and de-energized via the control circuit 32. As shown in FIG. 2, the coil 52 is in its energized state, thereby creating a sufficient magnetic force to pull the metal piston 68 to its retracted position against the spring force of the spring member 78. As the piston is being drawn from its extended position (FIG. 3) to its retracted position, fuel flows through the piston bore 66 through the piston valve 80. Then, when the coil 52 is in its de-energized state (FIG. 3), the spring force applied by the spring member 78 pushes the piston 68 to its extended position. As the piston 68 is being biased by the spring member 78 to move from its retracted position to its extended position, the piston valve 80 prevents the reverse flow of fuel back through the piston valve 80, and thus, any fuel downstream of the piston valve 80 within the bore 66 is pumped out of the bore 66 through the one-way valve member 64. This process is repeated at a predetermined frequency, such as about 19 hertz, for example.

The coil 52 is energized via voltage regulated by the control circuit 32. As such, the coil 52 is assured of receiving voltage that is within a predetermined voltage range and/or voltage that is applied for a specified period of time regardless of the voltage of the power source 14. As such, the input voltage from the power source 14 can be varied, such as between about 12V to 24V, for example, and the control circuit 32 can regulate the magnitude of the voltage that is delivered to the coil 52 and/or timeframe over which the voltage is sent to the coil 52, thereby altering the pulse width of the current sent to the coil 52. Accordingly, the lift pump 12 is suitable for use with a system having a power source including a variety of voltages, e.g., 12V or 24V, while being able to produce a predetermined fuel flow output at a predetermined flow rate regardless of the power source voltage. For example, if the lift pump 10 is connected to a 24V power source 14, the control circuit 32 can reduce the voltage from 24V to 12V for energizing the coil 52. Otherwise, in addition to reducing the voltage, or in lieu of reducing voltage, the control circuit 32 can reduce the pulse width of current supplied to the coil 32 to compensate for the increased voltage of the power source 14 to regulate the output flow rate of fuel from the lift pump 12.

It is to be understood that modifications and variations of the present invention are likely in view of the above teachings. It is, therefore, to be understood that the invention may be practiced otherwise than as specifically described, and that the scope of the invention is defined by any ultimately allowed claims.

What is claimed is:

1. A piston-type fuel pump, comprising:

a housing bounding an internal cavity;

a cylindrical tube disposed in said internal cavity, said cylindrical tube providing a bore extending along an axis;

a piston disposed in said bore;

a spring configured to bias said piston in a first direction along said axis;

a coil disposed about said cylindrical tube; and a control circuit disposed in said internal cavity, said control circuit being configured in electrical communication with said coil to regulate the actuation of said coil from a de-energized state to an energized state in response to a voltage supplied to said control circuit, said piston being biased in a second direction opposite said first direction when said coil is in said energized state, and wherein said control circuit is configured to output a generally constant and predetermined flow rate of fuel over a range of supply voltages.

2. The piston-type fuel pump of claim 1 wherein said control circuit is configured to receive a supply voltage ranging between 12V and 24V.

3. The piston-type fuel pump of claim 1 wherein said control circuit is configured to supply 12V to said coil in response to receiving a 24V supply voltage.

4. The piston-type fuel pump of claim 1 wherein said control circuit is configured to vary the pulse width to said coil.

5. The piston-type fuel pump of claim 1 wherein said fuel pump is a low pressure fuel pump and has an inlet configured for fluid communication with an upstream fuel tank and an outlet configured for fluid communication with a downstream high pressure fuel pump.

6. The piston-type fuel pump of claim 5 wherein said low pressure fuel pump is configured for fluid communication with a pressure sensor upstream from said low pressure fuel pump.

7. The piston-type fuel pump of claim 6 wherein said piston has a through bore coaxially aligned with said bore.

8. A fuel delivery system, comprising:

a fuel tank;

a high pressure fuel pump downstream of said fuel tank and configured in fluid communication with said fuel tank;

a low pressure fuel pump downstream of said fuel tank and upstream of said high pressure fuel pump, said low pressure fuel pump having an inlet configured in fluid communication with said fuel tank and an outlet configured in fluid communication with said high pressure fuel pump, said low pressure fuel pump including a control circuit configured to output a generally constant and predetermined flow rate of fuel over a range of supply voltages; and said low pressure fuel pump further including a housing bounding an internal cavity and a cylindrical tube disposed in said internal cavity and providing a bore extending along an axis and a piston disposed in said bore and a spring configured to bias said piston in a first direction along said axis and a coil disposed about said cylindrical tube.

9. The fuel delivery system of claim 8 wherein said control circuit is configured to receive a voltage varying between 12V and 24V.

10. The fuel delivery system of claim 9 wherein said control circuit is configured to supply 12V to said coil in response to receiving the varying voltage.

11. The fuel delivery system of claim 9 wherein said control circuit is configured to vary the pulse width to said coil.

12. The fuel delivery system of claim 8 further including a pressure sensor configured in fluid communication with said low pressure fuel pump.

13. The fuel delivery system of claim 12 wherein said pressure sensor is located between said low pressure fuel pump and said high pressure fuel pump.

* * * * *